United States Patent
Hong et al.

(10) Patent No.: US 7,459,083 B1
(45) Date of Patent: Dec. 2, 2008

(54) METHOD FOR CONTROLLING FOULING OF A MEMBRANE FILTER

(75) Inventors: Sun-Nan Hong, Cary, NC (US); Hong W. Zhao, Raleigh, NC (US); Richard W. DiMassimo, Raleigh, NC (US)

(73) Assignee: I. Kruger Inc., Cary, NC (US)

( * ) Notice: Subject to any disclaimer, the term of this patent is extended or adjusted under 35 U.S.C. 154(b) by 0 days.

(21) Appl. No.: 11/745,120

(22) Filed: May 7, 2007

(51) Int. Cl.
*C02F 3/00* (2006.01)

(52) U.S. Cl. .................. 210/620; 210/629; 210/741; 210/797

(58) Field of Classification Search .......... 210/620, 210/629, 741, 797, 106, 143, 150–151, 220
See application file for complete search history.

(56) References Cited

U.S. PATENT DOCUMENTS

| | | | |
|---|---|---|---|
| 6,743,362 B1 | 6/2004 | Porteous et al. | |
| 6,805,806 B2 | 10/2004 | Arnaud | |
| 6,926,832 B2 | 8/2005 | Collins et al. | |
| 6,946,073 B2 | 9/2005 | Daigger et al. | |
| 2007/0163959 A1* | 7/2007 | Cote et al. | 210/650 |

FOREIGN PATENT DOCUMENTS

| | | |
|---|---|---|
| CA | 2349661 | 5/2000 |
| CA | 2279766 | 1/2001 |
| CA | 2482517 | 3/2006 |
| WO | WO 2006029465 A1 * | 3/2006 |
| WO | 2007/006153 | 1/2007 |

OTHER PUBLICATIONS

Livingston, Dennis and Trivedi, Hiren; "Understanding Membrane Performance in MBR Applications Through Biohydraulics."
Yu, Kaichang; Wen, Xianghua; Bu, QingJie; and Xia, Huang; "Critical flux enhancements with air sparging in axial hollow fibers cross-flow microfiltration of biologically treated wastewater," Journal of Membrane Science 224 (2003) pp. 69-79.
Sofia, A.; Ng, W.J.; Ong, S.L.; "Engineering design approaches for minimum fouling in submerged MBR," Desalination 160 (2004) pp. 67-74.

(Continued)

*Primary Examiner*—Chester T Barry
(74) *Attorney, Agent, or Firm*—Coats & Bennett, P.L.L.C.

(57) ABSTRACT

A membrane bioreactor system includes one or more biological reactors and one or more membrane tanks with each membrane tank having one or more membrane filters. To control membrane fouling, various process control variables are employed. First, the membrane filters are cleaned by an air scouring process where bubbles are moved upwardly adjacent the membrane filters and clean the same in the process. To control membrane fouling, a process is utilized that dynamically varies the air scouring flow rate (V) as a function of transmembrane pressure (TMP). In addition, the process entails allowing permeation to start and stop which results in a series of cycles where each cycle includes a permeation phase and a relaxation phase. The duration of the relaxation phase (TR) and the duration of the permeation phase (TP) is varied from cycle to cycle as a function of one or more process variables including the change in TMP over a selected period within a membrane phase, or the change in TMP over a selected time period spanning at least two membrane phases.

9 Claims, 4 Drawing Sheets

OTHER PUBLICATIONS

Ueda, Tatsuki; Hata, Kenji; Kikuoka, Yasuto; and Seino, Osamu; "Effects of aeration on suction pressure in a submerged membrane bioreactor," Wat. Res., vol. 31, No. 3, pp. 489-494, 1997.

Chua, H.C.; Arnot, T.C.; Howell, J.A.; "Controlling fouling in membrane bioreactors operated with a variable throughput," Desalination 149 (2002) pp. 225-229.

Howell, J.A.; Chua, H.C.; Arnot, T.C.; "In situ manipulation of critical flux in a submerged membrane bioreactor using variable aeration rates, and effects of membrane history," Journal of Membrane Science 242 (2004) pp. 13-19.

Ji, Lei; Zhou, Jiti; "Influence of aeration on microbial polymers and membrane fouling in submerged membrane bioreactors," Journal of Membrane Science 276 (2006) pp. 168-177.

Psoch, C.; Schiewer, S.; "Long-term study of an intermittent air sparged MBR for synthetic wastewater treatment," Journal of Membrane Science 260 (2005) pp. 56-65.

Le-Clech, P.; Jefferson, B.; Judd, S.J.; "Impact of aeration, solids concentration and membrane characteristics on the hydraulic performance of a membrane bioreactor," Journal of Membrane Science 218 (2003) pp. 117-129.

Le-Clech, P.; Alvarez-Vazquez, H.; Jefferson, B.; Judd, S.; "Fluid hydrodynamics in submerged and sidestream membrane bioreactors," Water Science and Technology, vol. 48, No. 3, pp. 113-119.

Cooper, Nicholas B.; Marshall, John W.; Hunt, Kevin; Reidy, John G.; "Energy Usage and Control at a Membrane Bioreactor Facility," Water Environment Foundation, 2006, pp. 2518-2526.

* cited by examiner

METHOD FOR CONTROLLING FOULING OF A MEMBRANE FILTER

BACKGROUND

Membrane bioreactor (MBR) systems have become popular in wastewater treatment. MBR systems typically include one or more biological reactors, such as anaerobic, anoxic, and aerobic reactors, followed by one or more membrane tanks. Each membrane tank includes one or more membrane modules. A permeate pump creates a low pressure in the membrane modules and causes wastewater to be induced into the membranes. In the process, the membranes filter and reject contaminants such as suspended solids and produce a permeate.

It is expected that the trend towards utilizing membrane filters will increase as membrane costs decrease. Generally, MBR systems allow activated sludge processes to operate at a significantly higher MLSS concentration than with conventional clarification processes. As such, MBR systems eliminate the need for secondary clarifiers for liquid and solid separation. In addition to those advantages, MBR systems typically are constructed on a smaller footprint, and in the end, provides superior treated water quality.

The use of membranes in biological treatment is not without its drawbacks. One of the major concerns in utilizing submerged membranes is that they tend to foul and to provide continuous cleaning there is often provided air scouring. Air scouring results in a significant operating cost.

More particularly, membrane modules are submerged in a bioreactor and mixed liquor is suctioned through the membrane as permeate. As noted above, air scouring is provided below the membrane module and generates a cross flow movement across the membrane surface. This cross flow movement tends to clean the membrane and sustain permeation. Furthermore, it is typical to operate the membranes in on and off cycles. A cycle generally includes a permeation phase and a relaxation phase. The relaxation phase occurs when the permeate pump or pumps are shut off. During the relaxation phase, air scouring continues while permeation is suspended.

There are a number of process variables that are interrelated and impact the successful operation of an MBR system. The permeate flux determines the rate of transport of colloid and suspended solids towards the membrane surface. Because membrane filtration retains colloid and suspended solids, permeation results in concentration polarization (CP) and cake layer build up on the membrane surface. The higher the permeate flux, the faster the CP/cake layer will build up onto membrane surfaces. Both CP and cake layer limit the permeate flux in a constant pressure operation or result in an increase in transmembrane pressure (TMP) in a constant permeate flux operation.

Air scouring of the membranes induces a cross flow movement of water and/or shear force across the surface of the membrane, which increases the mass transfer of the retained colloids and suspended solids away from the membrane surface. In theory, suspended solids should not build up on a membrane surface if the convective flux of solids towards the membrane caused by permeation is less than the back transport of solids away from the membrane caused by the cross flow effect of air scouring. Therefore, while air scouring is effective, excess air scouring beyond a certain point has no positive affect on the reduction of CP and cake layer.

Scouring air provides a means to not only to minimize CP and the thickness of a sludge layer during a permeation phase, but also to clean the membrane surfaces during relaxation phases. If the membrane surfaces cannot be cleaned within each permeation-relaxation cycle, the cake layer will continue to deposit onto the membrane surface. This will lead to a rapid increase in TMP in a constant permeate flux operation or a rapid decrease in permeate flux in a constant pressure operation.

Generally, the greater the CP and cake layer build up, the greater is the degree of fouling because both phenomena increase the contact between the membrane surface and the fouling material. Membrane fouling will lead to an increase in the frequency of chemical-in-place (CIP) cleaning (chemical cleaning), thereby leading to more chemical consumption, less throughput in permeation phases, and shorter life expectancy of the membranes.

SUMMARY

A wastewater treatment process includes one or more submerged membrane filters in a membrane tank. To manage or control fouling or caking of the membrane filters during the wastewater treatment process, one or more process control variables are dynamically varied. These process control variables include air scouring flow rate, relaxation phase duration, and permeation phase duration.

In one embodiment, one or more process control variables are varied as a function of transmembrane pressure (TMP), or as a function of change in TMP over a selected time period. More particularly, in one embodiment, the change in TMP is determined in real time over a selected time period during a permeation phase, or over a selected time period spanning at least two permeation phases.

The wastewater treatment process also provides control logic which includes a hierarchal ordering scheme. That is, among the process control variables utilized by the control logic, one or more process control variables assume a priority over one or more other process control variables. For example, in an initial stage or phase of the control scheme, the control logic may look to one particular process control variable over others, and if certain conditions are met the control logic determines that further cycling through the control logic scheme is unnecessary.

In one particular embodiment, the process control variables include at least air scouring flow rate, permeation phase duration and relaxation phase duration. Hierarchal ordering of these process control variables means that the control logic first looks to one process control variable to determine if varying the process control variable is sufficient to meet certain process requirements. If yes, the control input is ordered and the control logic returns to an initial starting point. If no, the control logic continues to move through the control logic scheme and looks at the next highest ordered process control variable. This process continues until one of the selected process control variables can satisfy process requirements or until the control logic has cycled through the entire control logic scheme.

Other objects and advantages of the present invention will become apparent and obvious from a study of the following description and the accompanying drawings which are merely illustrative of such invention.

and $\Delta TMP_s$.

Figure 6:
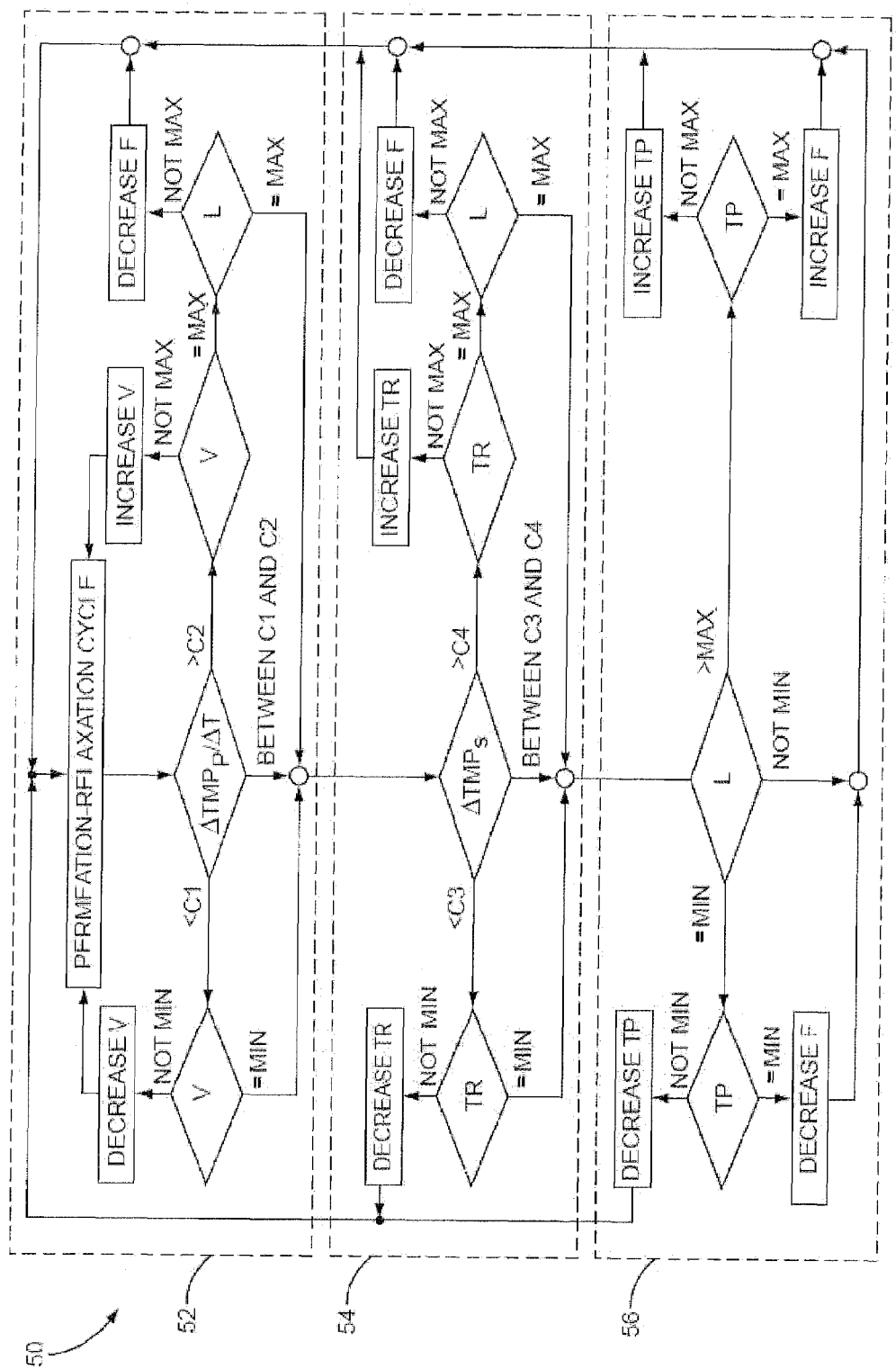

FIG. 6 is an example of a control logic scheme for controlling or managing membrane fouling and caking.

Figure 7:
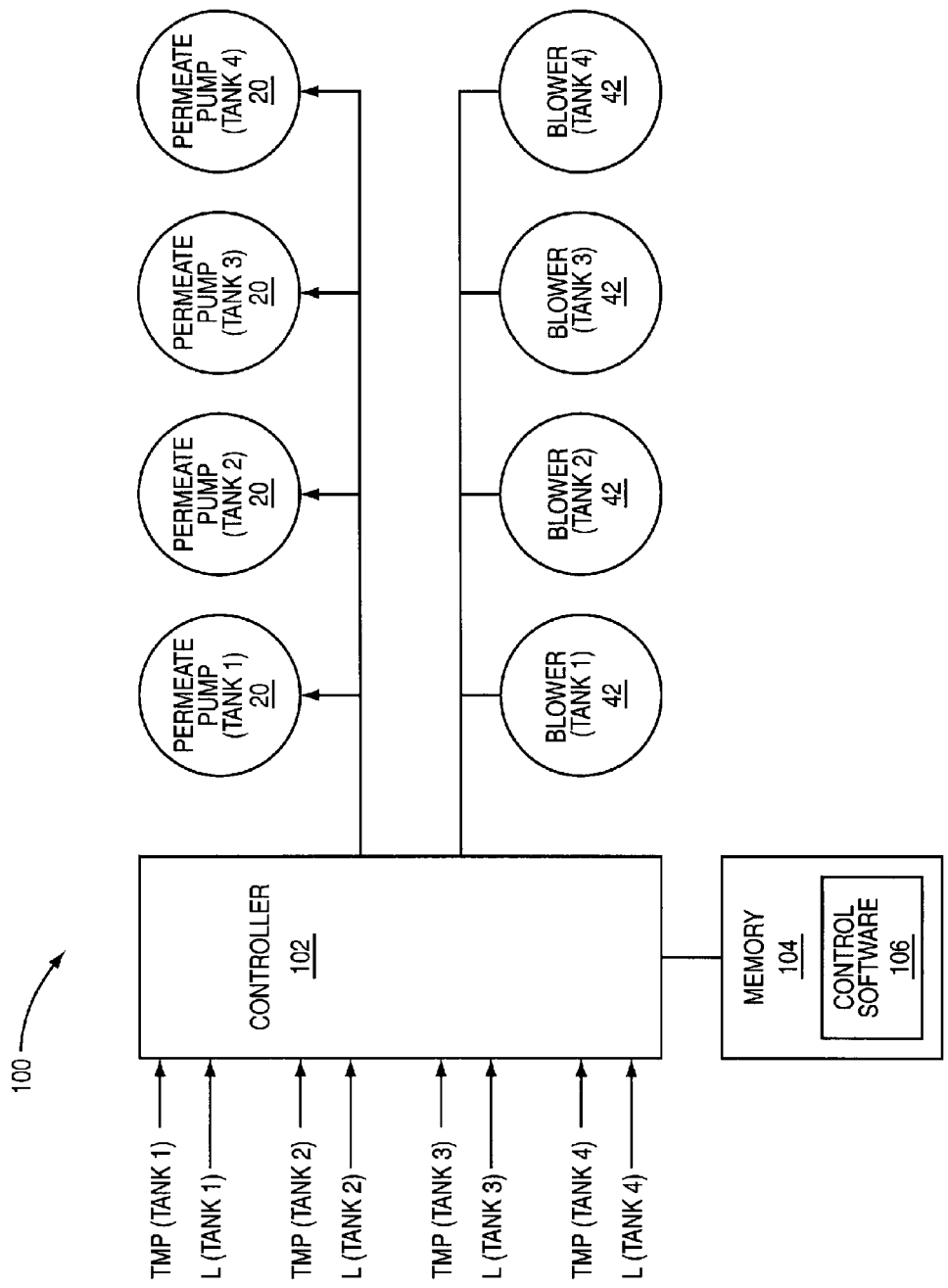

FIG. 7 is a schematic illustration of a typical control system for executing the control logic of FIG. 6.

DESCRIPTION OF EXEMPLARY EMBODIMENT

Figure 1:
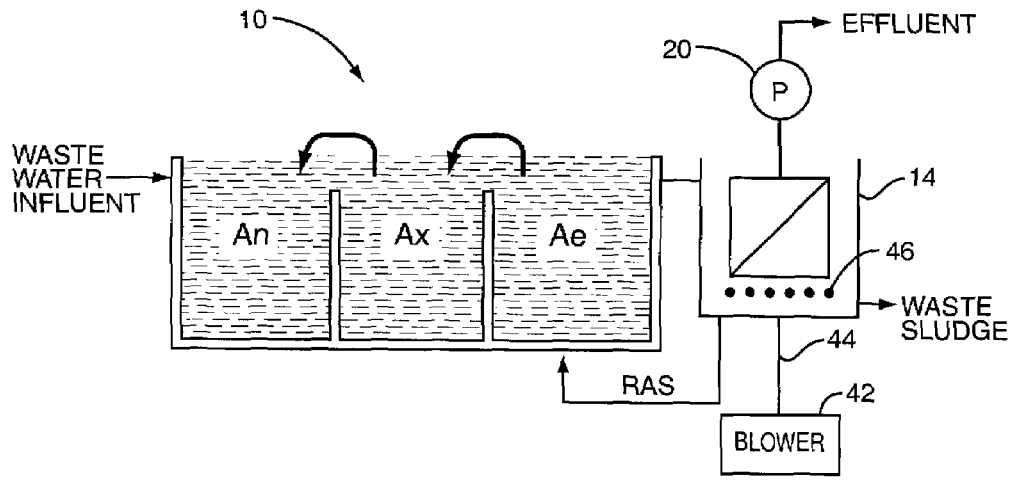
FIG. 1 is a schematic illustration of a membrane bioreactor system.
Figure 2:
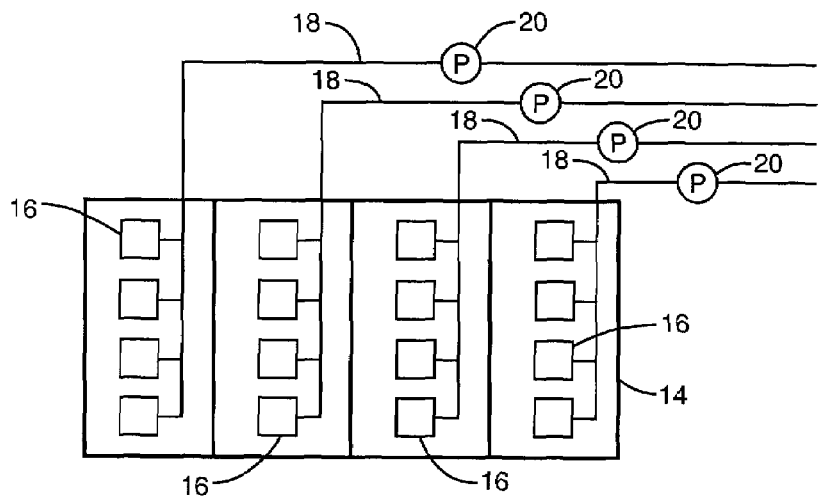
FIG. 2 is a schematic illustration of a top view of a series of membrane tanks with each membrane tank having a series of submerged membrane modules contained therein.

With further reference to the drawings, an example of a membrane bioreactor system is shown in FIG. 1 and indicated generally by the numeral 10. Various types of membrane bioreactor systems 10 can be employed for biologically treating wastewater. For example, the system 10 may be adapted to perform nitrification-denitrification processes, remove nutrients such as phosphorus and nitrogen, in addition to other contaminants such as BOD. In the example shown in FIG. 1, the membrane bioreactor system 10 includes a series of treatment tanks for carrying out biological treatment. In this example there is provided an anaerobic tank An, an anoxic tank Ax, and an aerobic tank Ae. Because of variations in influent flow, an equalization tank may be provided upstream from the anaerobic tank. Downstream from the aerobic tank Ae is one or more membrane tanks 14. Each membrane tank 14 typically includes a series of membrane modules 16. FIG. 2 illustrates a top plan view of four membrane tanks 14 disposed in side-by-side relationship. Each membrane tank 14 includes a series of the membrane modules 16. Each set of membrane modules 16 in each tank 14 is connected by a manifold 18 that leads to one or more permeate pumps 20. Details of the membrane modules 16 are not dealt with here because such is not per se material to the present invention and further, membrane modules are well known and appreciated by those skilled in the art. A membrane module 16 typically includes a series of membrane filters disposed in a bank or disposed in side-by-side relationship. Typically, each membrane filter includes a frame structure having a pair of opposed membrane surfaces and an interior area through which permeate flows. An outlet is provided for each membrane filter and the outlets of the respective membrane filters of each module are interconnected and each membrane module 16 includes an outlet that is communicatively connected to manifold 18.

Figure 3:
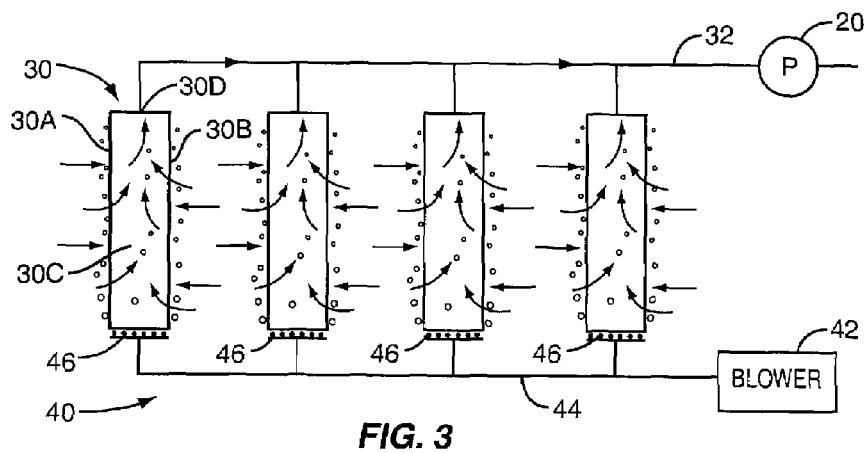
FIG. 3 is a schematic illustration of a portion of a membrane module having a series of membrane filters.

FIG. 3 schematically illustrates a series of membrane filters 30. Each membrane filter 30 includes opposed membrane surfaces 30A and 30B. Disposed internally within each membrane filter 30 is an interior area 30C that is open to an outlet 30D. A module manifold 32 extends between the respective membrane filters 30 of each module 16, the module manifold 32 interconnecting the various outlets 30D associated with each membrane module 16.

Each membrane tank 14 is provided with an air scouring system for continuously directing a system of air along the exterior sides of the membrane surfaces 30A, 30B for the purpose of removing cake layer and CP, and generally cleaning the membrane filters 30. This air scouring system is schematically illustrated in FIGS. 1 and 3, and indicated generally by the numeral 40. For each membrane tank 14, the air scouring system includes at least one variable flow blower 42 for directing air to one or more supply lines 44. Supply lines 44 channel pressurized air to outlets or diffusers 46 which are disposed below the membrane filters 30. Air scouring system 40 induces a cross flow movement of water and/or shear force, which increases the mass transfer of retained materials, colloids and suspended solids, away from the surfaces 30A and 30B of the respective membrane filters 30. This provides a cleaning action and tends to remove colloids and suspended solids that have adhered or become caked onto the outer surfaces of the membrane filters 30.

The membrane bioreactor system 10, exemplified in FIG. 1, is an activated sludge system. Activated sludge is returned from the membrane tank 14 to the aerobic Ae chamber via a return activated sludge (RAS) line. In the case of the particular biological treatment process shown in FIG. 1, mixed liquor from the aerobic tank Ae is recycled back to the anoxic tank Ax. Mixed liquor from the anoxic tank Ax is recycled back to the upstream anaerobic tank An. As pointed out above, FIG. 1 is simply an exemplary activated sludge process that utilizes biological treatment to remove selected contaminants. As will be appreciated from subsequent discussions, the disclosure herein relates to controlling or managing membrane fouling or caking. However, the process disclosed herein can be used with any wastewater or water treatment process that utilizes membrane filtration.

Figure 4:
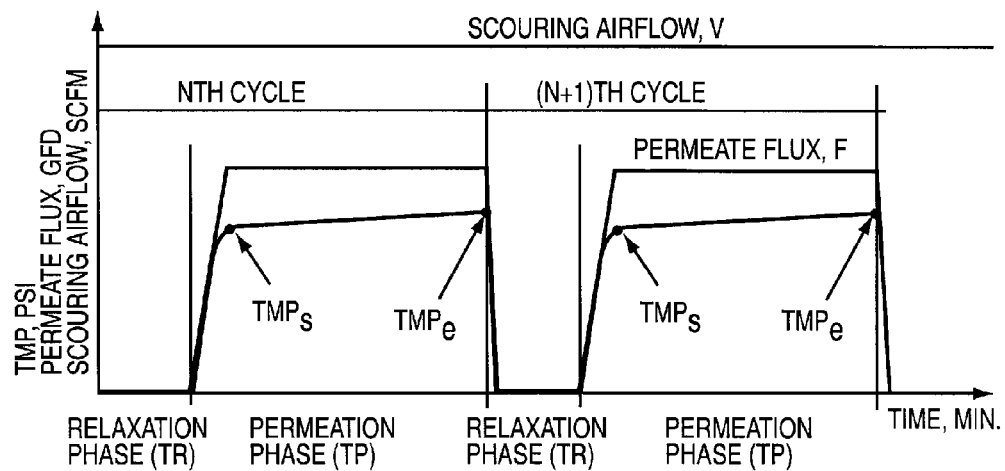
FIG. 4 is a graph that generally illustrates variations in transmembrane pressure over a number of permeation-relaxation cycles.

The present disclosure relates to controlling or managing the fouling and caking of the membrane filters 30 disposed in one or more membrane tanks 14. Typically, in a membrane bioreactor system 10, such as that shown in FIG. 1, the permeate pumps 20 are cycled on and off. In the example illustrated, permeate is induced through the membrane filter 30 by a permeate pump 20. However, it should be noted that permeate pumps are unnecessary in all applications as a gravity system can be employed. In the case of a gravity system, the permeation-relaxation cycle can be started, varied and stopped by actuating one or more control valves. FIG. 4 graphically illustrates two permeation-relaxation cycles. Each cycle includes a relaxation phase followed by a permeation phase or vice versa. The duration of a cycle can vary. For example, a cycle may extend for ten minutes and include a relaxation phase of one minute and a permeation phase of nine minutes. During the permeation phase, the permeate pumps 20 are on and wastewater is induced into the interior 30C of the respective membrane filters 30 to produce a permeate which is pumped from the membrane filters 30. Shutting the permeate pumps 20 off results in the initiation of a relaxation phase. During the relaxation phase, air from the air scouring system 40 is bubbled upwardly across the exterior of the membrane filters 30 creating a cross flow that tends to remove fouling material and the cake layer disposed on the exterior surfaces of the membrane filters 30.

There are a number of process control variables that can be controlled, and used to manage membrane fouling and caking. For example, the air scouring flow rate (V) can be varied. Generally the higher the air scouring flow rate, the more effective air scouring is in removing membrane fouling and caking. Another process control variable that impacts fouling is permeate flux (F). Permeate flux is a measure of the flow of permeate through the membrane filters 30, expressed in volume per area of membrane filter per unit of time. For example, permeate flux may be expressed in gallons per square foot of membrane surface area per day (GFD). Generally decreasing the permeate flux will decrease the rate of fouling. Likewise, adjusting the duration of the relaxation phase (TR) or the permeation phase (TP) can impact membrane fouling and provide conditions that improve the overall efficiency of the wastewater treatment process. TP is that part of a permeation-relaxation cycle where wastewater is induced into membrane filters to produce a permeate. TR is that part of a permeation-relaxation cycle where wastewater is not induced into the membrane filters and no permeate is produced. See FIG. 4 where TP and TR are illustrated. For example, increasing the duration of the relaxation phase of one or more succeeding cycles can contribute to reducing fouling. More particularly, increasing the duration of the relaxation phase provides more time for the air scouring system to clean the exterior surfaces of the membrane filters 30 while no permeate is being induced into the interior 30C of the membrane filters.

Therefore, as will be appreciated from subsequent portions of this disclosure, various combinations of process control variables is utilized to control and manage on a dynamic bases membrane fouling and caking. Dynamic control, as used herein, means that the system and process adjusts or varies some or all of these process control variables from cycle to cycle. This does not necessarily mean that there will be a change in at least one process control variable during each cycle. Rather, the system and process will monitor certain other process variables, and from time-to-time during the process, will adjust one or more process control variables. In one embodiment, certain process variables are sensed or monitored during each or selected cycles, and the system and process has the option of adjusting one or more of the process control variable during the next succeeding cycle or during a later cycle. In some exemplary examples, the process is designed to consider implementing a control input during each permeation-relaxation cycle. However, the process may be designed to dynamically consider implementing a control input at any selected time in the process. For example, the control logic may be programmed to consider certain process variables every third cycle and to implement control functions based on those process variables in the second, third or fourth succeeding cycle.

There are numerous approaches to varying and adjusting these process control variables. Generally, selected process variables, that are variables other than the control variables, are sensed or monitored, and one or more of the process control variables are varied accordingly. In the process embodiment illustrated herein one process variable utilized is transmembrane pressure (TMP). TMP is a measure of the differential pressure across the surface of a membrane filter 30. That is, with respect to a single membrane filter 30, TMP is a measure of the difference in pressure between a point outside of the membrane filter and a point in the interior 30C of the membrane filter, which can be expressed in pounds per square inch (psi). Those skilled in the art readily appreciate that TMP can be directly measured or calculated based on certain variables. In many cases TMP can be calculated based on head pressure within the membrane tank 14 and the pressure within the membrane filter 30. As illustrated in FIG. 2, a typical membrane bioreactor system 10 will include multiple membrane tanks 14. The control approach disclosed herein aims at controlling membrane fouling and caking on a tank by tank basis because each membrane tank 14 will typically include multiple membrane modules 16 with each module having multiple membrane filters 30. An average TMP across all or a selected number of membrane modules 16 in a tank can be calculated.

In addition to TMP, one control process disclosed herein measures and monitors water level (L) in each of the membrane tanks 14. Sensed or monitored water level L may be compared with water level set points, maximum water level ($L_{max}$) and minimum water level ($L_{min}$). For example, during a wastewater treatment process, the liquid level L in the membrane tank 14 is measured during each permeation-relaxation cycle. Depending on the control logic, the measured liquid level L is compared with $L_{max}$ and/or $L_{min}$, and based on the results of that comparison, in some cases, the permeate flux F can be varied.

Returning to a discussion of TMP, the control processes disclosed herein aim at maintaining a generally constant TMP from cycle to cycle. Thus, simply monitoring TMP at any point in any permeation phase, and dynamically adjusting one or more of the process control variables, such as air scouring flow rate, will provide some measure of membrane fouling control. There are, however, specific TMP measurements that may be more pertinent than others. For example, one approach is to view a simple change in TMP over any selected time period ($\Delta TMP$). There are numerous approaches here.

First, the control process can determine the $\Delta TMP$ at any two points in a single permeation phase or at any two points across two or more permeation phases. This yields a $\Delta TMP$ over a selected time period. Ideally, from a control point of view, it is desirable for $\Delta TMP$ to be minimal or relatively flat. In the absence of control inputs, the natural tendency is for TMP to gradually increase from cycle to cycle, or over time. In any event, once a $\Delta TMP$ has been determined for any selected time period, then the control process can select and cause one or more process control variables to act in response to the $\Delta TMP$.

Figure 5:
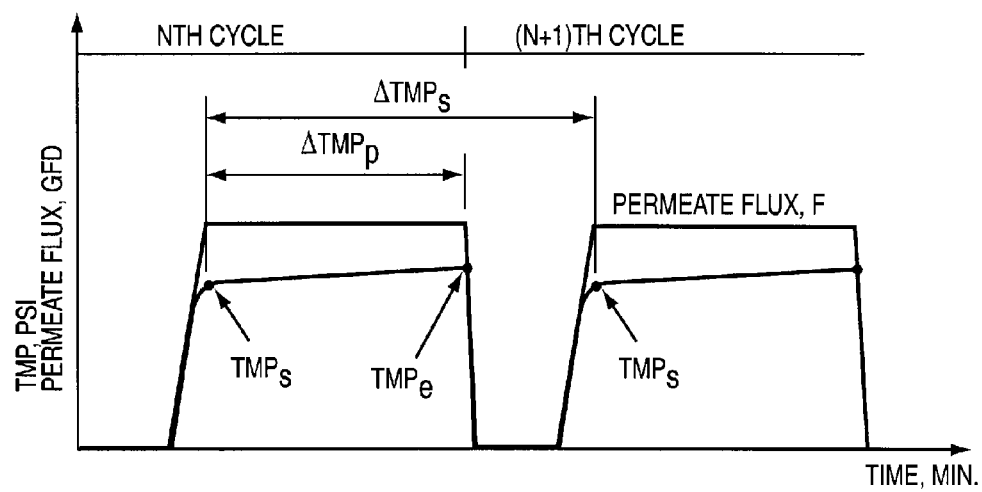
FIG. 5 is a graph similar to FIG. 4, but which illustrates and $$\frac{\Delta TMP_p}{\Delta T}$$

As noted above, certain changes in TMP may be more significant than others. FIG. 5 shows an illustration where $\Delta TMP$ is determined based on two corresponding points in two succeeding permeation phases. In this embodiment the process measures a starting or beginning TMP ($TMP_s$) in each permeation phase, and calculates on an ongoing basis the difference between succeeding $TMP_s$'s. The difference is denoted $\Delta TMP_s$.

$$\Delta TMP_s = TMP_s^{n+1} - TMP_s^n$$

$TMP_s$ in each permeation phase is measured at a selected permeate flux set point or, as illustrated in FIG. 5, where the permeate flux reaches steady state.

Another TMP variable that may be significant in a control process is the change in TMP during a particular permeation phase. This is simply referred to as $\Delta TMP_p$. See FIG. 5.

$$\Delta TMP_p = TMP_e - TMP_s$$

In one controlled process there is provided a hierarchal order where some process control variables have priority over others. In one particular process, control logic utilized first looks to implement a change in air scouring flow rate V. That is, under certain conditions air scouring flow rate V is increased or decreased a selected amount and the control logic returns to an initial starting point. However, if certain conditions are not met and varying the air scouring flow rate V is not appropriate, then the control logic drops down to a lower level or cycle and determines if one or more other process control variables can be changed in order to implement an appropriate measure of control. In one process control embodiment, the air scouring flow rate V has priority over the duration of the relaxation phase TR or the duration of the permeation phase TP. In like manner, there may be a hierarchal order with respect to TR and TP. In one process control, TR is given priority over TP. Furthermore, two or more process control variables can be included in the same control logic level or cycle. For example, in cases where the air scouring flow rate V assumes an upper level position in the control logic cycle, permeate flux F can also be included in that same control logic cycle, but subordinate or secondary to air scouring flow rate V. See FIG. 6 for example. In such a case, process conditions may not permit the air scouring flow rate V to be adjusted, but may, based on certain process variables, enable the permeate flux F to be varied without the control logic cycling or moving to the next highest order of control.

Turning to FIG. 6, a control logic scheme is shown therein and indicated generally by the numeral 50. Control logic scheme 50 is a hierarchal scheme that includes a series of levels or cycles. In the case of the particular control logic scheme disclosed therein, there is provided an initial air scouring cycle described in block 52 and which takes priority over a relaxation phase cycle 54. Disposed below the relaxation phase cycle 54 is a permeation phase cycle 56. In executing the control process and varying the process control variables such as V, TR, TP and F, changes in these process control variables are instituted in incremental changes where each change is a predetermined amount. That is, for example, each time the air scouring flow rate V is changed, the magnitude of the change, either up or down, is the same. It is appreciated, however, that the process and system can be controlled to vary the magnitude of change for any of the process control variables. That is, based on a process variable being sensed such as $$\frac{\Delta TMP_p}{\Delta T},$$

the air scouring flow rate V could be changed from cycle to cycle based on the magnitude of $$\frac{\Delta TMP_p}{\Delta T}.$$

Expressed in another way, the change in V from cycle to cycle may vary depending on the magnitude of a sensed process variable such as $$\frac{\Delta TMP_p}{\Delta T}.$$

In the exemplary control process shown in FIG. 6, certain process control variables have maximum and minimum values. For example, in the case of air scouring flow rate, relaxation phase duration, and permeation phase duration, there is programmed a maximum and minimum value for each.

Also, in the case of the exemplary process shown in FIG. 6, the control process continues to monitor and determine changes in TMP, which in the case illustrated, monitors $$\frac{\Delta TMP_p}{\Delta T}$$

and $\Delta TMP_s$. Throughout the control process, $$\frac{\Delta TMP_p}{\Delta T}$$

and $\Delta TMP_s$ are compared with a series of set or control points C1, C2, C3 and C4. Set points C1-C4 are selected based on tests or empirical data and programmed into the logic control. These set points can be changed from time-to-time.

The control logic disclosed in FIG. 6 is designed to operate on a permeation-relaxation cycle by permeation-relaxation cycle basis. That is, selected process variables are sensed and determined during each cycle. Based on the sensed, measured or calculated process variable, control is implemented on the next succeeding permeation-relaxation cycle. It should be appreciated, however, that the control logic can be designed in various ways with respect to the permeation-relaxation cycles. For instance, process variables do not have to be sensed every cycle. They could be sense or monitored at various cycle intervals. In similar fashion, the control logic does not have to implement or consider implementing a control input during every permeation-relaxation cycle. Rather, the control logic can or consider implementing a control input with respect to one of the process control variables at selected permeation-relaxation cycles.

Viewing FIG. 6, during each permeation-relaxation cycle, $$\frac{\Delta TMP_p}{\Delta T}$$

is determined. If $$\frac{\Delta TMP_p}{\Delta T}$$

is less than C1 and if V is not at a minimum, then the control logic decreases the air scouring flow rate V by the selected amount during the succeeding permeation-relaxation cycle. No other control inputs are made in the succeeding permeation-relaxation cycle. However, if V is at a minimum, then the control logic moves down to the second level or control cycle 54. If on the other hand $$\frac{\Delta TMP_p}{\Delta T}$$

is greater than C2, and V is not a maximum, then the control logic causes V to be increased the selected amount in the succeeding permeation-relaxation cycle. However, if V is already at a maximum, then the control logic looks at the level L of the water in the membrane tank 14. If L is not a maximum, then the control logic decreases the permeate flux F a set amount during the next succeeding permeation-relaxation cycle. However, if L is a maximum, then the control logic precedes to the second order of control, the control logic block 54.

In some cases $$\frac{\Delta TMP_p}{\Delta T}$$

may be between C1 and C2. In that case, as indicated in FIG. 6, the control logic moves down to the second control order or the control scheme found in control cycle 54.

The system and process is designed to sense or determine $\Delta TMP_s$. In the second order of control, if $\Delta TMP_s$ is less than C3, and if TR is not at a minimum, then the control logic decreases TR by the set amount in the next succeeding permeation-relaxation cycle. However, if TR is a minimum, then the control logic cycles down to the third order of control or the control scheme found in block 56. If, on the other hand, $\Delta TMP_s$ is greater than C4 and TR is not a maximum, then the control logic orders an increase in TR of the selected amount during the succeeding permeation-relaxation cycle. However, if TR is a maximum, then the control logic looks at L, and if L is not a maximum, then the control logic orders a decrease in F of the selected amount in the next succeeding permeation-relaxation cycle. If L is a maximum, the control logic is programmed to proceed to the third order of control, or the control scheme disclosed in block 56. Furthermore, it is possible that $\Delta TMP_s$ is between C3 and C4. In that case the control logic is programmed to also proceed to the third order of control or the control logic found in block 56.

Once the control logic reaches control elements found in block 56, the control logic looks at L, and if L is less than the maximum and is not at the minimum, no control input is made to the succeeding permeation-relaxation cycle. If, however, L is at the minimum and TP is not at the minimum, the control logic orders the selected decrease in TP during the next succeeding cycle. If, however, TP is at a minimum, then the control logic orders a decrease in F during the succeeding permeation-relaxation cycle. On the other hand, if L is greater than the maximum and TP is not at the maximum, the control logic orders an increase in TP of a set amount in the succeeding cycle. However, if TP is at the maximum, then the control logic orders an increase in F during the succeeding permeation-relaxation cycle.

Various process variables can be monitored and measured and implemented in the control logic scheme in various ways. For example, in the FIG. 6 embodiment, $$\frac{\Delta TMP_p}{\Delta T}$$

and $\Delta TMP_s$ can be interchanged, and C1-C4 appropriately adjusted. Further, the hierarchal order of control can be varied. For example, TR or TP may be assigned a higher order than V. Further, TP may be assigned a higher order than TR. In addition, the exemplary logic control shown in FIG. 6 utilizes two forms of TMP, that is $\Delta TMP_p$ and $\Delta TMP_s$. Other forms of TMP such as $TMP_e$ or simply a change in TMP over two selected points spanning two or more permeation periods can be used.

Various forms of control systems can be utilized to dynamically sense certain process variables and to implement control functions based on the sensed or monitored control variables. FIG. 7 shows one exemplary embodiment of a control system indicated generally by the numeral 100. Control system 100 includes a controller 102 and a memory 104 having control software 106 associated therewith. Signals representing various process variables are directed to the controller 102. In one particular control process, during each permeation-relaxation cycle one or more forms of TMP is monitored and measured (or calculated) as well as the liquid level L for each membrane tank 14. Controller 102 receives this data or information, and based on the control software 106 and particularly a control logic such as shown in FIG. 7, orders control implementations of various process control variables such as V, TR, TP and F. Each membrane tank is provided with a permeate pump 20. In the case of a gravity-operated system, a control valve is provided for varying the permeate flow and for modulation. By varying the on and off time for the respective values or permeate pumps 20, the controller 102 adjusts and varies TR and TP, and effectively, the duration of the permeation-relaxation cycle. Further, in the case of permeate pumps 20, the pumps are either of a variable flow type or each membrane tank 14 includes a series of pumps in order that the controller 102 may vary the permeate flux F. Likewise, as depicted in FIG. 7, controller 102 controls one or more aerators or blowers 40 associated with each membrane tank 14. Aerators 40 are of the variable flow type or each membrane tank includes a series of aerators in order that the controller can effectively vary the air scouring flow rate V to each membrane tank 14.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for controlling fouling of a membrane filter in a biological wastewater treatment process, comprising:
   directing wastewater influent into one or more reactors and treating the wastewater;
   directing the wastewater into and through one or more membrane tanks having one or more membrane filters therein;
   filtering the wastewater by directing the wastewater through the membrane filters and producing a permeate;
   cleaning the membrane filters with air scouring;
   measuring trans-membrane pressures and a liquid level in at least one of the membrane tanks;
   executing multiple control cycles to control scouring air flow rate, flux, permeation phase duration, and relaxation phase duration;
   in at least one of the control cycles, optionally adjusting each of scouring air flow rate and flux as a function of the measured trans-membrane pressures and of the measured liquid level in the membrane tank;
   in at least one of the control cycles, optionally adjusting each of relaxation phase duration and flux as a function of the measured trans-membrane pressures and of the measured liquid level in the membrane tank; and
   in at least one of the control cycles, optionally adjusting each of flux and permeation phase duration as a function of the measured liquid level in the membrane tank.

2. The method of claim 1 including:
   measuring trans-membrane pressure at a first point in a permeation phase;
   measuring trans-membrane pressure at a second point in the permeation phase;
   calculating the difference in the trans-membrane pressure measured at the first point in the permeation phase and the trans-membrane pressure measured at the second point in the permeation phase and determining the rate of change of the trans-membrane pressure over a selected period of time; and
   adjusting the scouring air flow rate or the flux as a function of the rate of change of the trans-membrane pressure and the measured liquid level in the membrane tank.

3. The method of claim 2 including:
   selecting a pair of set point values such that one set point value is larger than the other set point value;

in the event that the rate of change of the trans-membrane pressure is between the selected pair of set point values, adjusting neither the scouring air flow rate nor the flux in response to the difference;

in the event that the rate of change of the trans-membrane pressure is less than the smaller of the selected set point values, decreasing the scouring air flow rate if the velocity is not at a maximum allowable flow rate value; and in the event that the rate of change of the trans-membrane pressure is greater than the larger of the selected set point values, increasing the scouring air flow rate if the scouring air flow rate is not at the maximum allowable flow rate value or decreasing the flux if the measured liquid level is not at a maximum allowable liquid level value.

4. The method of claim 1 including:

measuring trans-membrane pressure at a first point in a first permeation phase and measuring trans-membrane pressure at a second point in a second permeation phase;

determining the difference between the trans-membrane pressure measured at the first point and the trans-membrane pressure measured at the second point; and adjusting the relaxation phase duration or the flux as a function of the difference in trans-membrane pressure and the measured liquid level in the membrane tank.

5. The method of claim 4 including:

selecting a pair of set point values such that one set point value is larger than the other set point value;

in the event that the difference in trans-membrane pressure is between the pair of selected set point values, adjusting neither the relaxation phase duration nor the flux in response to the difference;

in the event that the difference in trans-membrane is less than the smaller of the selected set point values, decreasing the relaxation phase duration if the duration is not at a minimum allowable relaxation phase duration value; and in the event that the difference in trans-membrane pressure is greater than the larger of the selected set point values, increasing the relaxation phase duration if the duration is not at a maximum allowable relaxation phase duration value or decreasing the flux if the measured liquid level is not at a maximum allowable liquid level value.

6. The method of claim 1 including:

in the event the measured liquid level in the membrane tank is not at a minimum allowable liquid level value, adjusting neither then permeation phase duration nor the flux in response to the measured liquid level;

in the event the measured liquid level in the membrane tank is at the minimum allowable liquid level value, decreasing the permeation phase duration if the duration is not at a minimum allowable permeation phase duration value, or decreasing the flux if the permeation phase duration is at a minimum allowable phase duration value; and in the event the measured level in the membrane tank is above the maximum allowable liquid level value increasing the permeation phase duration if the permeation phase duration is not at a maximum allowable phase duration, or increasing the flux if the permeation phase duration is at the maximum allowable phase duration.

7. A method for controlling fouling of a membrane filter in a biological wastewater treatment process, comprising:

directing wastewater influent into one or more reactors and treating the wastewater;

directing the wastewater into and through one or more membrane tanks having one or more membrane filters therein;

filtering the wastewater by directing the wastewater through the membrane filters and producing a permeate;

cleaning the membrane filters with air scouring;

measuring a liquid level in a membrane tank;

executing one or more control cycles to control one or more control variables; and in at least one control cycle, adjusting one control variable selected from the group including scouring air flow rate, flux, permeation phase duration, and relaxation phase duration as a function of the measured liquid level.

8. A method for controlling fouling of a membrane filter in a biological wastewater treatment process, comprising:

directing wastewater influent into one or more reactors and treating the wastewater;

directing the wastewater into and through one or more membrane tanks having one or more membrane filters therein;

filtering the wastewater by directing the wastewater through the membrane filters and producing a permeate;

cleaning the membrane filters with air scouring;

measuring a first change in trans-membrane pressure during a permeation phase, measuring a second change in trans-membrane pressure from the start of a first permeation phase to the start of a second permeation phase, and measuring liquid level in the membrane tank;

executing a hierarchy of control cycles to control one or more control variables;

in a first control cycle, adjusting a control variable selected from the group including scouring air flow rate and flux as a function of the measured first change in trans-membrane pressure and of the measured liquid level;

in a second control cycle, adjusting a control variable selected from the group including relaxation phase duration and flux as a function of the second measured change in trans-membrane pressure and of measured the liquid level; and in a third control cycle, adjusting a control variable selected from the group including permeation phase duration and flux as a function of the measured liquid level.

9. A method for controlling fouling of a membrane filter in a biological wastewater treatment process, comprising:

directing wastewater influent into one or more reactors and treating the wastewater;

directing the wastewater into and through one or more membrane tanks having one or more membrane filters therein;

filtering the wastewater by directing the wastewater through the membrane filters and producing a permeate;

cleaning the membrane filters with air scouring;

executing a series of filtration cycles, each filtration cycle including a permeation phase and a relaxation phase wherein a membrane filter undergoes permeation during the permeation phase followed by relaxation during the relaxation phase;

measuring a first trans-membrane pressure at a first point in the permeation phase of a first filtration cycle;

measuring a second trans-membrane pressure at a second point in the permeation phase of a second filtration cycle;

measuring a third trans-membrane pressure at a third point in the permeation phase of the second filtration cycle;

measuring a liquid level in a membrane tank;

executing control logic that includes a hierarchy of control levels to optionally adjust scouring air flow rate, flux, permeation phase duration, and relaxation phase duration for a third filtration cycle;

in a first control level, optionally adjusting each of scouring air flow rate and flux as a function of the first measured trans-membrane pressure, the second measured trans-membrane pressure, and the measured liquid level in the membrane tank;

in a second control level, optionally adjusting each of relaxation phase duration and flux as a function of the second measured trans-membrane pressure, the third measured trans-membrane pressure, and the measured liquid level in the membrane tank; and in a third control level, optionally adjusting each of flux and permeation phase duration as a function of the measured liquid level in the membrane tank.

* * * * *